United States Patent [19]

Davison et al.

[11] 4,251,413

[45] Feb. 17, 1981

[54] SEALANT MATERIAL

[75] Inventors: Joseph A. Davison; Graham W. Hall, both of Cheltenham; Newton J. Hodges, Charlton Kings; David W. Price, Cheltenham, all of England

[73] Assignee: Coal Industry (Patents) Limited, London, England

[21] Appl. No.: 109,023

[22] Filed: Jan. 2, 1980

Related U.S. Application Data

[63] Continuation of Ser. No. 777,055, Mar. 14, 1977, abandoned.

[30] Foreign Application Priority Data

Apr. 12, 1976 [GB] United Kingdom ............... 13420/76

[51] Int. Cl.$^3$ ................................................ C08J 9/30
[52] U.S. Cl. ...................... 260/29.6 MM; 260/29.6 R; 521/68; 521/91; 521/65; 521/149; 521/910
[58] Field of Search ................. 260/29.6 M, 29.6 MM

[56] References Cited

U.S. PATENT DOCUMENTS

| | | | |
|---|---|---|---|
| 2,465,295 | 3/1949 | Strauss | 260/29.6 MM |
| 2,930,770 | 3/1960 | Wade | 260/29.6 MM |
| 2,993,017 | 7/1961 | Sucetti | 260/29.6 MM |
| 3,215,660 | 11/1965 | Bryan et al. | 260/29.6 MM |
| 3,239,475 | 3/1966 | Clark | 260/29.6 MM |
| 3,278,466 | 10/1966 | Cram et al. | 521/95 |
| 3,421,277 | 1/1969 | Frischmuth | 260/29.6 MM |
| 3,483,156 | 12/1969 | Mills, Jr. et al. | 260/29.6 MM |

*Primary Examiner*—Morton Foelak
*Attorney, Agent, or Firm*—James Creighton Wray

[57] ABSTRACT

A sealant for the remedial sealing of self-sealing coke oven doors, or ordinary coke oven doors sealed with a conventional lute, or for sealing spigot joints in off-gas pipe lines in coke oven installations comprises a mixture of from 25 to 45% of a latex, (preferably a PVA-based latex) from 10 to 25% water, from 25 to 45% of a particulate filler (preferably a talc) and from 5 to 15% of an inorganic fibre (preferably an asbestos fibre). At least 40% of the fibre should pass through a British standard 100-mesh sieve.

The sealant may vary from a flowable to a putty or paste-like consistency and may be applied by spraying or trowelling as appropriate. If the inorganic fibre is not an asbestos the sealant may also include a proportion of a water soluble thickener to enhance the compatibility of the mixture.

3 Claims, No Drawings

SEALANT MATERIAL

This is a continuation of application Ser. No. 777,055 filed Mar. 14, 1977, now abandoned.

This invention concerns a sealant especially, but not exclusively, useful for sealing coke oven doors. It is envisaged as being applicable for the remedial sealing of worn self-sealing coke oven doors or ordinary doors which have been sealed with a lute, and for sealing spigot joints and the like in off-gas pipelines from coke ovens.

Coke ovens can be severly damaged if, during operation, air is allowed to enter them. To prevent this, the pressure inside the coke oven and the off-gas pipelines is maintained higher than atmospheric pressure by up to 7 mm, typically 1 to 4 mm. water gauge. Thus the gas inside the system can escape to the atmosphere, causing pollution and increasing the danger of fires outside the coke oven.

In order to reduce the amount of pollution the doors of the coke ovens of the ordinary type may be sealed around their edges with a conventional clay-based lute, or a foamable lute as described in our co-pending U.S. Pat. No. 4,111,709, or the doors are of the self-sealing type. These measures substantially reduce the escape of pollution gases.

However, lutes dry out during the operation of the coke oven, and the lute shrinks, cracks and separates from the metal of the door and/or frame even though this problem is significantly lessened with the foamable lute. Also gaps form between the self-sealing doors and their frames because the doors, after a number of operational cycles, may become warped or because tar build-up on the doors may prevent proper sealing. Polluting gases can escape through the cracks and gaps, and can also escape from ill-fitting spigot joints in the off-gas pipelines of coke ovens.

It is an aim of the present invention to provide a sealant which can be applied easily to cracks, gaps and spigot joints in a coke oven system to prevent the escape of polluting gases to the atmosphere. The sealant should be effective as a sealant, even though it may become brittle, at least for the time necessary to complete the carbonisation cycle of the coke oven at a temperature of up to 200° C., which is the maximum temperature the sealant normally experiences in such uses during the cycle. The average time of a cycle is about 16 hours. The sealant should be effective as a sealant and should remain flexible for much longer at about 80° C., which is the average temperature of a spigot joint after a water spray in the off-gas pipeline. The flexibility is necessary to allow for movement of the joints during the operation of the coke oven over a long period.

All percentages hereinafter are by weight of the total composition unless otherwise stated.

The sealant according to the invention comprises from 25 to 55% of a latex, from 10 to 25% water, from 25 to 45% of a particulate filler, and from 5 to 15% of an inorganic fibre, at least 40% of which fibre will pass through a British Standard 100-mesh sieve.

The latex should preferably contain about 50% solids and have a pH value of not less than 4.5. Especially suitable are latexes based on poly-vinyl acetate (PVA).

Preferably, the particulate filler is finer than 200 mesh (British Standard), and is conveniently a talc.

The inorganic fibre may be mineral wool, or glass, ceramic or asbestos fibres, and preferably is an asbestos of the amosite variety.

Ceramic fibres may have different wetting properties from those of asbestos fibres. Therefore if ceramic fibres are used in the sealant composition it may be necessary to incorporate therein a water soluble thickening agent, such as sodium carboxymethyl cellulose, in an amount sufficient to ensure that all the components of the composition are intimately mixed with one another. The exact amount of thickening agent necessary will depend on the properties of the ceramic fibre used, but it usually about 2% by weight of the total water content of the composition.

There may also be included in the sealant as described above from 0.5 to 5%, preferably less than 1%, of a blowing agent which decomposes to give off gas in the temperature range from 140° to 220° C. The inclusion of a blowing agent will tend to counteract any skrinkage of the sealant during the cycle of the coke oven.

The blowing agent may be a mixture of two or more blowing agents. A particularly suitable blowing agent is a mixture of "Genitron" OB, blowing in the temperature range from 140° to 160° C., and "Genitron" AC2, blowing in the range from 190° to 220° C. These blowing agents may be admixed in amounts by weight of from 3:1 to 1:3, but conveniently a 1:1 ratio by weight is used. "Genitron" blowing agents are marketed by Fisons Industrial Chemicals, Cambridge.

The composition of the sealant can be varied within the defined limits to give varying flow properties, the quantity of fibre being especially important in this respect. A paste-like sealant which can be applied by a trowel is obtained by using relatively low amounts of water and relatively high amounts of fibre. Paste-like sealants are particularly useful for sealing spigot joints and cracks appearing in dried lutes on ordinary coke oven doors.

A flowable sealant, which can be applied by an applicator gun, is given by using relatively high amounts of water and relatively low-amounts of fibre. With flowable sealants the present invention the gun of application number 27712/75 does not require a piston in the reservoir, but the sealant can be supplied under the action of air pressure. Flowable sealants are particularly useful for sealing gaps around self-sealing coke oven doors.

Accordingly, this invention also provides a method of sealing a crack or gap through which gases may escape, comprising applying to said crack or gap a sealant as described above.

The sealant and method of the present invention could also be used in other systems where escaping gases produce pollution, for instance around furnaces and piping in industrial chemical complexes or around pottery kilns etc.

By way of example only, three formulations of sealant according to the invention are given below.

|  | Sealant 1. | Sealant 2. | Sealant 3. |
| --- | --- | --- | --- |
| PVA-latex | 35% | 47% | 35% |
| Water | 15% | 20% | 15% |
| Talc | 40% | 26% | 39% |
| Asbestos Fiber | 10% | 7% | 10% |
| Blowing agent | — | — | 1% |

In these examples the PVA-latex used in Vinyl Products Ltd. Grade 99830 PVA-latex, the talc is English China Clay Co. grade S2 talc, the asbestos is Cape Asbestos Fibres Ltd. Amosite Grade S44 for Grade S6605, and the blowing agent is a 1:1 mixture by weight of "Genitron" OB and "Genitron" AC2.

The sealants are normally prepared by diluting the PVA-latex with water to give the appropriate proportions of latex and water, mixing the talc (and, if included, the blowing agent) into the PVA-latex/water mixture, and finally mixing in the asbestos fibre. The addition of the asbestos fibre causes the mixture to become more viscous and so care must be taken to ensure that complete mixing is achieved.

Sealants 1 and 3 are particularly suitable for application by trowel, and may be used to seal cracks in conventional lutes around ordinary coke oven doors and to seal spigot joints. They are of a kneadable or putty-like consistency. They are flexible and remain so for a considerable time at about 80° C.

Sealant 2 is particularly suitable for application by spray gun, and may be used to seal gaps around worn self-sealing coke oven doors.

The sealants according to the invention and illustrated above retain their sealing action around coke oven doors for at least the duration of one operational cycle of the coke oven and seal spigot joints for at least six months during the normal operation of the coke ovens, and are effective in reducing the amount of pollution caused by the operation of coke ovens.

What is claimed is:

1. A sealant composition comprising a coke oven door sealant for coke oven doors and joints and like installations which coke oven doors sealant remains effective as a sealant to prevent gas leakage from coke oven doors and joints and the like at temperatures up to about 200° C., the coke oven door sealant having from about 25 to 55% polyvinyl acetate-based latex, said latex having a solids content of about 50% and having a pH of not less than about 4.5, the sealant having from about 10 to 25% water, and having from about 25 to 45% of a particulate filler, which is finer than 200 mesh British Standard, the coke oven door sealant having from about 5 to 15% of an inorganic fiber, at least about 40% of which fiber will pass through a 100 mesh British Standard sieve, the coke oven door sealant being effective as a sealant against gas leakage for several hours at temperatures up to about 200° C. and the coke oven door sealant being effective as a gas sealant and remaining flexible at temperatures of up to about 80° C. for several months.

2. A sealant composition according to claim 1, in which the particulate filler is a talc.

3. A sealant composition according to claim 1, in which the fiber is selected from a group of fibers consisting of asbestos fiber and ceramic fiber.

* * * * *